United States Patent [19]

Dekoninck

[11] 4,142,616
[45] Mar. 6, 1979

[54] TORQUE-LIMITING DEVICES

[75] Inventor: Jean Dekoninck, Vossem, Belgium

[73] Assignee: David Brown Sadi S.A., Brussels, Belgium

[21] Appl. No.: 773,076

[22] Filed: Feb. 28, 1977

[30] Foreign Application Priority Data

Mar. 17, 1976 [GB] United Kingdom ............... 10648/76

[51] Int. Cl.² .............................................. F16D 43/20
[52] U.S. Cl. ...................................... 192/56 R; 64/29
[58] Field of Search ................. 192/56 R, 150; 64/29

[56] References Cited

U.S. PATENT DOCUMENTS

| | | | |
|---|---|---|---|
| 2,045,572 | 6/1936 | Dow | 192/56 R |
| 2,497,893 | 2/1950 | Linahan | 192/56 R |
| 2,778,468 | 1/1957 | Babaian | 192/56 R |
| 3,266,607 | 8/1966 | Frisbie | 192/56 R |
| 3,701,404 | 10/1972 | Cassell | 192/56 R |
| 3,722,644 | 3/1973 | Steinhagen | 64/29 X |

*Primary Examiner*—Allan D. Herrmann
*Attorney, Agent, or Firm*—Norris & Bateman

[57] ABSTRACT

A torque-limiting device comprises co-axial input and output members, a component axially slideable on but constrained to rotate with one of the members, a plurality of balls engageable in respective pairs of seats formed in adjacent faces of the component and the other of the members, a helical compression spring co-axial with the members for urging the faces towards one another, and a spring-loaded plunger carried by the component and engageable in a hole in that one of the members on which the component is slideable so as automatically to hold the device disengaged when a torque over-load causes the balls to move out of the seats and thus forces the faces away from one another against the action of the spring.

5 Claims, 2 Drawing Figures

TORQUE-LIMITING DEVICES

BACKGROUND OF INVENTION

The invention relates to torque-limiting devices of the kind disclosed in U.K. patent specification No. 809101 which employ hardened steel balls. In devices of this kind, wear of the balls and their seats is high where speeds in excess of, say, 200 revolutions per minute are transmitted, and a limit switch for stopping the input drive on disengagement of the device has hitherto been essential in practice. Above a speed of, say, 500 revolutions per minute such a device has hitherto been suitable only as an infrequently used safety device.

The object of the present invention is to provide such a device with built-in means for automatically holding the device disengaged in the event of over-load so as to prevent "ratcheting" of the device and consequent wear and noise, and thus to render the device suitable for use at substantially higher speeds than hitherto.

SUMMARY OF INVENTION

According to the invention, a torque-limiting device comprises co-axial input and output members, an axially slideable component constrained to rotate together with one of said members, a plurality of balls engageable in respective pairs of recesses formed in adjacent faces of the component and the other of said members, resilient means for urging said faces towards one another along the rotational axis of the device to hold the balls engaged in the recesses so that said balls transmit drive from the input member to the output member up to a pre-determined torque value at which they move out of the recesses and force said faces away from one another along said rotational axis to disengage the device, and mechanical detent means for automatically holding the device disengaged when said faces have been forced away from one another.

BRIEF DESCRIPTION OF DRAWINGS

A preferred embodiment of the invention will now be described by way of example, with reference to the accompanying drawings of which.

DESCRIPTION OF PREFERRED EMBODIMENT

Figure 1:
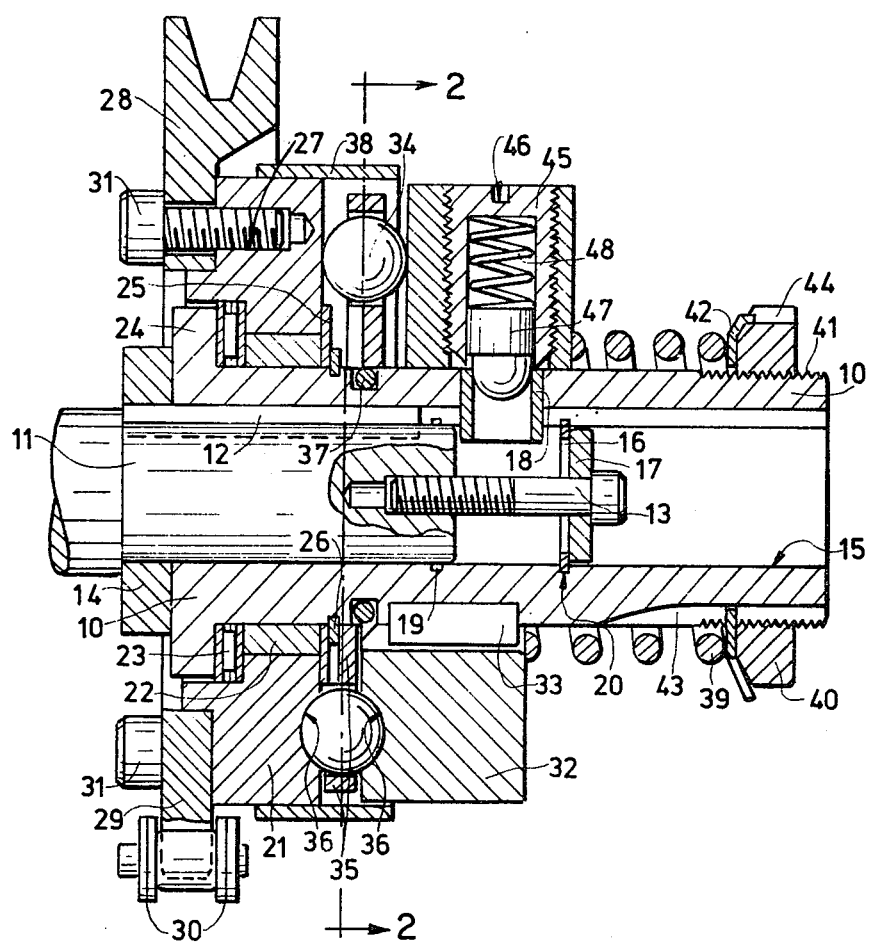
FIG. 1 is a sectional side elevation of a torque-limiting is a sectional side elevation of a torque-limiting device rigidly secured on a driving shaft, the device being shown below its rotational axis in its engaged condition and with a chain sprocket rigidly secured to its output member, and above its rotational axis held in its disengaged condition and with a belt pulley rigidly secured to its output member.

Referring now to the drawing, a torque-limiting device comprises an input member in the form of a sleeve 10 adapted to be rigidly secured on a driving shaft 11 consisting of the output shaft of an electric motor (not shown) by means of a key 12 and a set-screw 13. A spacer 14 is disposed between the sleeve 10 and a shoulder on the shaft 11. The sleeve 10 is adapted to be secured selectively at either of its ends on the shaft 11 by locating in its bore 15 a circlip 16 against either end-face of which there is adapted to abut a washer 17 on the set-screw 13. Due to the tube 18, hereinafter referred to, projecting into the bore 15 at the mid-point of the length of the sleeve 10, two alternative annular grooves 19 and 20 are provided for the circlip 16. An annular output member 21 co-axially surrounds one end of the sleeve 10, and is journalled thereon by means of a bush 22. A thrust bearing 23 is disposed between the output member 21 and a shoulder formed by a flange 24 on the sleeve 10, and the member 21 is retained in position by a washer 25 and a circlip 26. The output member 21 is provided with a circle of screw-threaded holes 27 to enable a belt pulley 28, a sprocket 29 for driving a chain 30, a toothed gear (not shown), a resilient coupling (not shown), a gear-toothed coupling (not shown) or the like to be rigidly secured to it by set-screws 31. When a pulley, sprocket or gear is fitted, the driving shaft 11 is preferably secured in that end of the sleeve 10 adjacent the output member 21 as shown in the drawing; but when a coupling is fitted in order to transmit drive to a shaft co-axial with the driving shaft 11, it is essential that the latter be secured in that end of the sleeve 10 remote from the output member 21, which necessitates relocation of the circlip 16 in the groove 19. An annular component 32 surrounds the mid-part of the sleeve 10, and is mounted thereon by means of three circumferentially-spaced keys 33 so as to be axially slideable on but constrained to rotate together with said sleeve. Six hardened steel balls 34 carried by a cage 35 are engageable in respective pairs of recesses 36 formed in the adjacent faces of the component 32 and the output member 21, and a O-ring 37 housed in an annular groove in the sleeve 10 is provided to prevent the cage 35 from rattling when the device is disengaged. The balls 34 and the cage 35 are protected from dirt by an annular shroud 38 fixed to the output member 21. The component 32 is urged towards the output member 21 along the rotational axis of the device by a single helical compression spring 39 co-axially surrounding that end of the sleeve 10 remote from the member 21 and confined between the component 32 and a nut 40 engaging an externally-threaded zone 41 of the sleeve 10. The force of the spring 39 is adjustable by screwing the nut 40 along the zone 41 and locking it in the required position by a tab-washer 42 engageable in axial grooves 43 and 44 in the sleeve 10 and the nut 40 respectively. The component 32 houses mechanical detent means comprising a hollow externally-threaded plug 45 with a slot 46 for engagement by a screw-driver. The plug 45 contains a plunger 47 loaded by a helical compression spring 48. The centre-line of the plunger 47 is disposed in the same radial plane as the centre-line of the tube 18, and the rounded inner end of the plunger 47 is engageable in the tube 18 as described in the following paragraph.

In operation, the torque-limiting device transmits drive from the sleeve 10 and the component 32 keyed thereon to the output member 21 by way of the balls 34 which are held engaged in the recesses 36 (as shown below the rotational axis of the device in the drawing) by the spring 39 up to a torque value pre-determined by the position of the nut 40 and by the depth and shape of said recesses. Whilst the device is thus engaged, the plunger 47 is not aligned with and thus cannot engage in the tube 18. If, however, the pre-determined torque value is exceeded, the balls 34 are caused to move out of the recesses 36 and force the component 32 away from the output member 21 along the rotational axis of the device against the action of the spring 39 so as to disengage the device (as shown above said axis in the drawing). Immediately disengagement of the device occurs, the plunger 47 is moved into alignment with and automatically engages in the tube 18 as illustrated so as to hold the device disengaged, and consequently the driving shaft 11, the sleeve 10 and the component 32 can continue to rotate without transmitting any drive to the output member 21 and without the occurence of "ratcheting", that is to say without repeated attempts by the balls 34 to re-engage in the recesses 36 with consequent wear and noise. This enables speeds up to, say, 2000 revolutions per minute to be transmitted. The plunger 47 is releaseable from the tube 18 by stopping the driving shaft 11 and then partially unscrewing the plug 45 by means of a screw-driver from the component 32 until the latter can be moved back by the spring 39 into its engaged position and the balls 34 are heard to re-engage in the recesses 36, whereupon the plug 45 must be screwed back into its operative position. The transmission of drive by the device can then be recommenced.

It is feasible to employ the member 21 as the input member and the sleeve 10 as the output member if desired.

Figure 2:
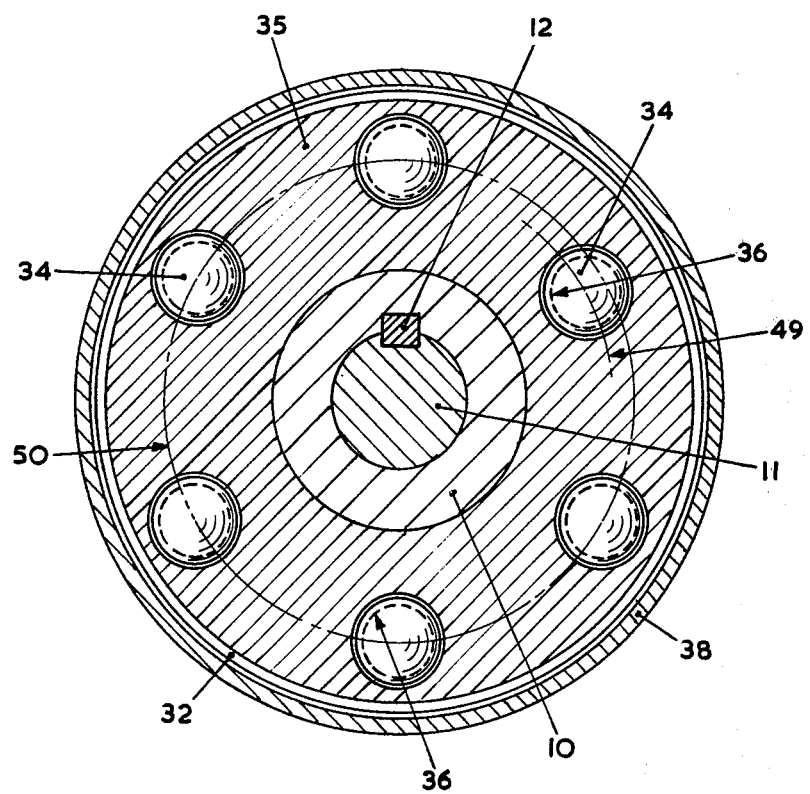
FIG. 2 is a section on the line 2—2 in FIG. 1 showing a modification of the device.

In a modification illustrated in FIG. 2, one of the balls 34 and one pair of the recesses 36, that is to say one of the recesses 36 in each of the component 32 and the output member 21, are disposed on a pitch circle 49 of a slightly different radius to the pitch circle 50 as the other balls 34 and recesses 36. This ensures that the component 32 and the member 21 can only be driveably engaged together in one particular angular relationship.

In another modification, the shroud 38 is replaced by a hollow casing fixed to the output member 21 and enclosing the balls 34, the cage 35, the component 32 and the spring 39. That end of the casing remote from the member 21 is journalled on the periphery of the sleeve 10, and the spring 39 is confined between the component 32 and the inner face of said end of the casing. In place of the screw-threaded zone 41, the nut 40 and the tab-washer 42, the casing is formed in two portions having a lockable screw-threaded connection between them for adjusting the force of the spring 39 by varying the axial length of the space in which it is confined. An aperture is formed in the casing to give access to the plug 45.

I claim:

1. A torque-limiting device comprising a rotatable drive input member in the form of a hollow sleeve of substantially uniform inner diameter from end to end having means for connecting it to a driving shaft, an output member mounted by bearing means upon and coaxially with said sleeve, a third member coaxially mounted on said sleeve by means that constrains said third and input members to rotate together but provides for axial sliding of said third member along said sleeve, a cage disposed between adjacent axially facing surfaces of said third and output members for retaining a plurality of circumferentially spaced balls, said surfaces being formed with recesses wherein said balls are engageable, resilient means in the form of a coil spring surrounding said sleeve and disposed between said sleeve and said third member for biasing said third member toward said output member whereby to maintain said balls engaged in said recesses during torque transmission through the device, means providing a thrust bearing axially between said output member and said sleeve, said balls being adapted to move out of said recesses to become disposed between non-recessed areas of said surfaces to displace said third member against the force of said spring when the transmitted torque exceeds a predetermined value, and means for holding said third member in displaced position comprising radially open recess means on said sleeve and radially spring biased detent means on said third member for entering said recess means upon predetermined displacement of said third member away from said output member.

2. A torque-limiting device according to claim 1, wherein one of the balls and one pair of the recesses are disposed at a different pitch circle radius to the remainder.

3. A torque-limiting device according to claim 1, wherein the force of the resilient means is adjustable to vary the torque value at which the device disengages.

4. A torque-limiting device according to claim 1, wherein the bore of the sleeve contains a circlip against which there is adapted to abut a washer on a set-screw engageable in a threaded hole in the end of said shaft to secure the sleeve rigidly on said shaft.

5. A torque-limiting device according to claim 1, wherein the sleeve is adapted to be rigidly secured selectively at either of its ends on said shaft.

* * * * *